(12) United States Patent
Youn et al.

(10) Patent No.: US 8,401,071 B2
(45) Date of Patent: Mar. 19, 2013

(54) VIRTUALLY LOSSLESS VIDEO DATA COMPRESSION

(75) Inventors: Jeongnam Youn, San Jose, CA (US); Yuji Wada, Tokyo (JP)

(73) Assignees: Sony Corporation, Tokyo (JP); Sony Electronics Inc., Park Ridge, NY (US)

(*) Notice: Subject to any disclaimer, the term of this patent is extended or adjusted under 35 U.S.C. 154(b) by 1247 days.

(21) Appl. No.: 12/103,419

(22) Filed: Apr. 15, 2008

(65) Prior Publication Data

US 2009/0161753 A1 Jun. 25, 2009

Related U.S. Application Data

(60) Provisional application No. 61/015,174, filed on Dec. 19, 2007.

(51) Int. Cl.
*H04N 7/12* (2006.01)

(52) U.S. Cl. .............. 375/240.01; 375/240.26; 382/232; 382/234

(58) Field of Classification Search .............. 375/240.01
See application file for complete search history.

(56) References Cited

U.S. PATENT DOCUMENTS

| | | | |
|---|---|---|---|
| 5,293,252 A * | 3/1994 | Kim et al. ............... | 382/250 |
| 6,256,347 B1 | 7/2001 | Yu et al. | |
| 6,668,015 B1 * | 12/2003 | Kranawetter et al. ..... | 375/240.12 |
| 8,086,052 B2 * | 12/2011 | Toth et al. ............... | 382/236 |
| 2002/0039143 A1 | 4/2002 | Sasaki | |
| 2002/0181583 A1 * | 12/2002 | Corbera ................... | 375/240.03 |
| 2007/0189620 A1 * | 8/2007 | Hu .......................... | 382/238 |
| 2007/0269118 A1 | 11/2007 | Sasaki et al. | |

FOREIGN PATENT DOCUMENTS

| | | |
|---|---|---|
| EP | 1 947 862 A1 | 7/2008 |
| GB | 2 339 989 A | 2/2000 |
| JP | 2001-506085 A | 5/2001 |
| JP | 2002-111989 A | 4/2002 |
| JP | 2007-312126 A | 11/2007 |
| WO | 98/26605 | 6/1998 |
| WO | 2007043609 A1 | 4/2007 |

OTHER PUBLICATIONS

European Patent Office, Counterpart European patent application No. 08 253 669.9—Office Action dated Jul. 15, 2010 and pending claims.

(Continued)

*Primary Examiner* — Jay Patel
*Assistant Examiner* — Jessica Prince
(74) *Attorney, Agent, or Firm* — John P. O'Banion

(57) ABSTRACT

An apparatus and method of performing YUV (or YCrCb) video compression prior to storage within a memory and decompression upon retrieval of the blocks from memory. Compression is performed utilizing a quantizer to compress video data to a desired overall compression ratio R, even though the luma and chroma contributions to compression can differ for each subblock, each preferably selected in response to texture estimation. Selections are made for each subblock to perform either linear or non-linear quantization during compression. Compression is performed without utilizing data from blocks outside of the block being compressed, wherein video blocks can be retrieved and decompressed in any desired order. In one implementation, an encoder non-sequentially selects blocks from memory which are then decompressed and encoded. The compression may be beneficially utilized in a number of different video transmission and storage applications without departing from the invention.

38 Claims, 12 Drawing Sheets

OTHER PUBLICATIONS

European Patent Office, Summons to Attend Oral Proceedings, EPO Application No. 08 253 669.9, dispatched Jan. 26, 2011, coversheet and pp. 1-3 with claims (pp. 29-32), corresponds to U.S. Appl. No. 12/103,419.

Japanese Patent Office, Official Action dispatched on Aug. 20, 2012, corresponding Japanese patent application No. 2008-324222, English translation (pp. 1-5), claims examined (pp. 6-11), original Japanese language copy (pp. 12-16),pp. 1-14.

Patent Office of the Russian Federation, Official Action issued on Mar. 1, 2012, corresponding Russian patent application No. 2008150330, English translation (pp. 1-3), original Russian language copy (pp. 4-8), with claims (pp. 9-14), claiming priority to U.S. Appl. No. 12/103,419 and 61/015,174, pp. 1-14.

* cited by examiner

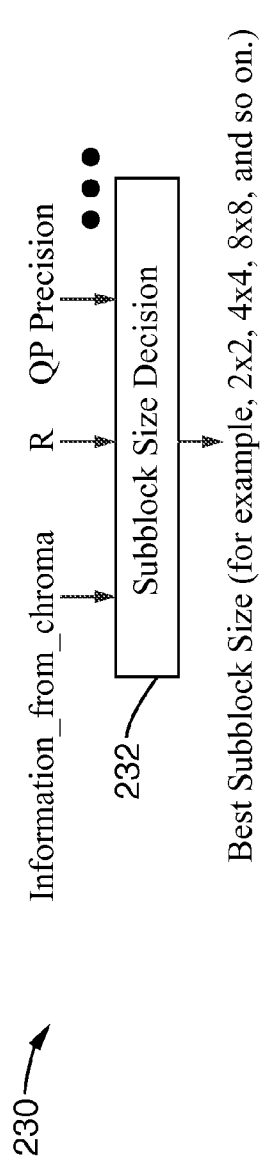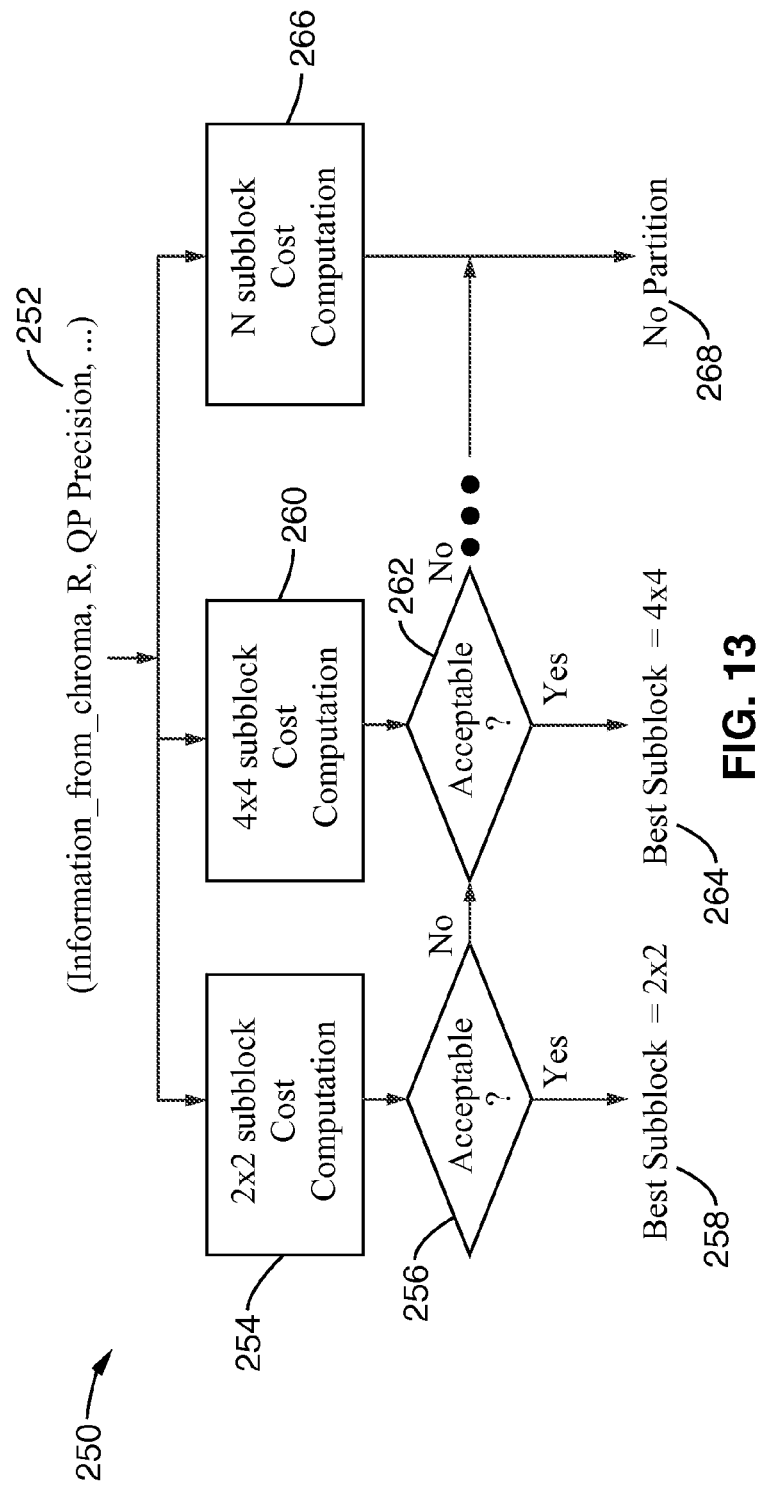

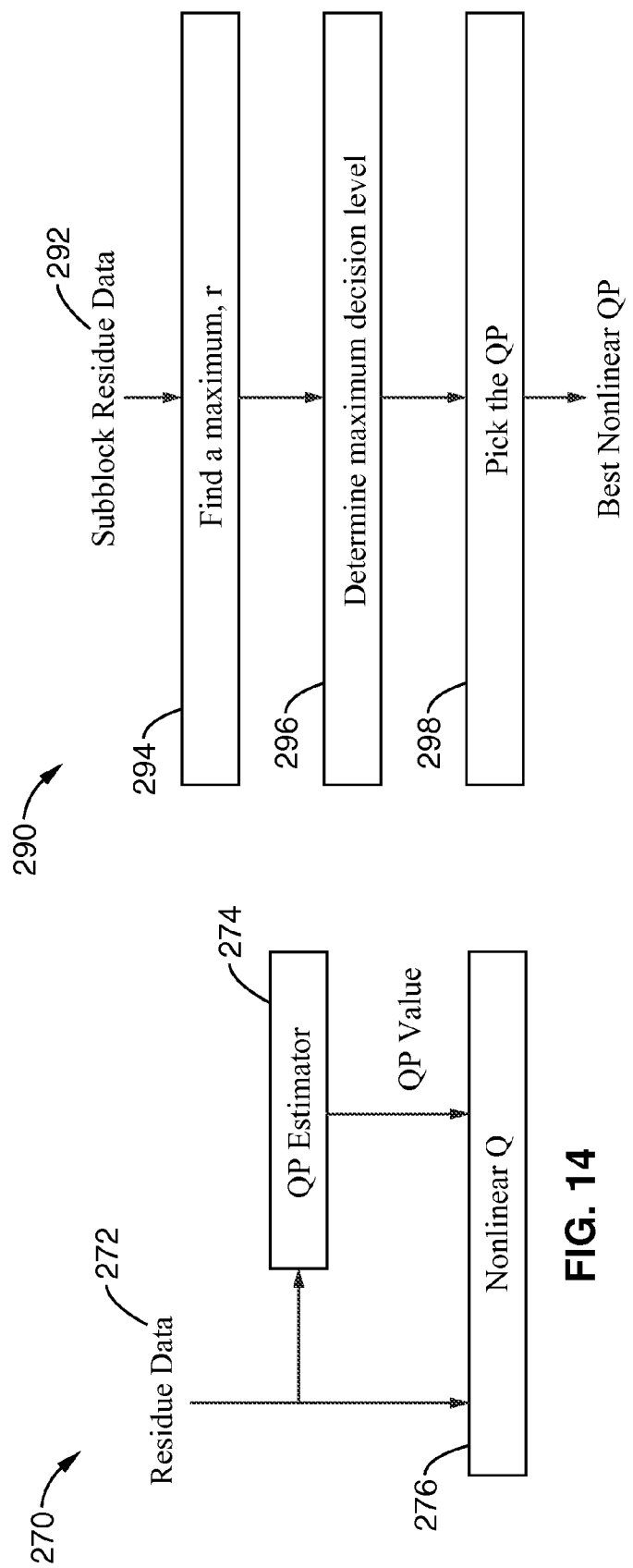

VIRTUALLY LOSSLESS VIDEO DATA COMPRESSION

CROSS-REFERENCE TO RELATED APPLICATIONS

This application claims priority from U.S. provisional application Ser. No. 61/015,174 filed on Dec. 19, 2007, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to video processing, and more particularly to the compression and decompression of video within video memory prior to encoding or output.

2. Description of Related Art

A typical video architecture is implemented to preprocess video data prior to storing it in a video frame memory typically accessed through an external bus. The video data is then retrieved from the video memory during an encoding process and/or for output. The amount of data transfer between the encoder and the video memory over the bus may be very large, leading to the need for large amounts of video memory, requiring enormous memory bus bandwidth, and consequently leading to high power consumption.

FIG. 1 shows a conventional video camera or still-picture camera architecture. The input video obtained by an input device, such as CCD or CMOS sensors, is then stored in an external memory after being preprocessed. In general preprocessing comprises noise reduction and video data conversion from RGB (Red, Green, Blue) to YUV (one luminance Y, two chrominance U+V). Other processing devices, such as a video encoder or a display device, then read the video data from the video memory.

Since the amount of video data is generally large, the required bus bandwidth for video data transfer through the external bus is significantly high. In particular with regard to HD (High Definition) video application, the required bus bandwidth is enormous, wherein bandwidth cost as well as power consumption become very high making it difficult to implement low-cost image/video systems.

Another technical challenge in video camera systems is in regard to the required memory size. Most video devices are implemented in Soc (System on Chip). In general, the cost of an external memory (such as SDRAM) is generally higher than other devices. Therefore, a reduction of required memory size allows the overall system cost to be reduced.

Accordingly, a need exists for a method for reducing necessary storage bandwidth and memory for video data streams, and in particular when performed prior to the video encoding process. The present invention fulfills that need as well as others and overcomes the limitations of prior solutions.

BRIEF SUMMARY OF THE INVENTION

An apparatus and method is described for visually lossless video data compression which utilizes a YUV Video Data Compression/Decompression Method. For the sake of simplicity, the term YUV video will be utilized herein, while it should be appreciated that YCrCb video, or other similar encodings are equally applicable to the teachings and claims recited herein. A video input is compressed by partitioning each frame into a set of compressed blocks having a given number of pixels for each component (e.g., N pixels for Y, M pixels for U, V). The compression blocks do not overlap other compression blocks and can thus be processed independently of one another without the need to reference information from other compression blocks, wherein the video data can be accessed randomly which is particularly well suited for use by a video encoder. As a result storage of the compression blocks in memory require less memory storage as well as bus bandwidth in view of the smaller size of the compressed blocks. Afterward, the compressed video data is retrieved in any desired order (e.g., non-sequentially) from memory and decompressed, such as by an encoder, and/or less preferably for output to a display. Decompression restores the data to its original format, wherein the device or application utilizing the decompressed data need not be aware that it was ever compressed.

Complexity estimations are preferably performed prior to compression so that optimum levels and modes of compression can be determined.

During compression, predictions are made to predict the current pixel value based on previous pixels, then subblock sizing is determined and subblocks partitioned. Decisions are then made as to the type of quantization (e.g., linear or non-linear), such as preferably for each subblock. For non-linear quantization, an aspect of the invention provides estimation of the quantization parameter (QP), wherein not all possible values for QP need be searched. Quantization is then performed based on the above determinations, and finally the subblocks of compressed data are packed into blocks. During compression, one aspect of the invention first performs the chroma compression, wherein information from chroma compression is made available and utilized during luma compression. Aspects of the present invention provide for the selection of different levels of compression in response to the complexity of the video data and the number of bits available. Compressed luma and chroma are combined into a final compressed block.

Since the types and levels of quantization are determined in response to the complexity of the data, the compressed video data upon decompression (although not exactly matching the original video data) would still appear to a human viewer as visually lossless. Thus, the inventive apparatus and method operates with lowered memory requirements and reduced bandwidth while producing an output of a desired quality, up to that of being visually lossless.

The objectives of reducing bus bandwidth and/or memory size is given above as an example. The applications of the compression method is not limited to such specific application benefits, but can be applied to provide benefits in any other applications that require video data compression, for example in transmission of compressed video data over a network prior to decompression, or in storing compressed video data to any other media device, prior to decompression, such as with hard disks or memory.

The invention is amenable to being embodied in a number of ways, including but not limited to the following descriptions.

An implementation of the invention is a video memory apparatus configured for communicating video pixel data with one or more video modules, comprising: (a) a video compression module coupled through a signal bus to the video memory and configured for, (a)(i) compressing luminance and chrominance YUV input video data using a quantizer, without utilizing pixel data from pixels outside of each block, into compressed video data having a reduced number of bits per pixel, (a)(ii) storing the compressed video data within the video memory; and (b) a video decompression module configured for retrieving blocks of compressed video data in any order and decompressing the compressed video data stored in the video memory into decompressed video data which has the same format and approximates the original video data which was received and compressed by the video compression module, wherein said video decompression module configured to output the decompressed video data.

In the video apparatus, compression is preferably performed according to an overall compression ratio R, that controls the extent of block compression and which can be expressed ratiometrically, or in terms of the number of bits contained in the resultant block. In at least one preferred embodiment, the same or different compression levels are selected for luma and chroma while maintaining overall compression ratio R. In at least one preferred mode, unless chroma has a high complexity level, the extent of compression is selected by the apparatus to minimize bit use in chroma, while optimizing bit use in luma.

In at least one implementation of the video apparatus, texture complexity is estimated for the compression blocks prior to compression. The allocation of compression space to luma and chroma within each block, such as the number of bits to be allocated for luma and chroma within the compressed block, are determined in response to a process of estimating texture complexity.

In at least one implementation, luma and chroma information are combined into compressed video data blocks, which are preferably padded with padding bits to maintain a fixed size for the compressed blocks.

In at least one configuration of the apparatus, luma compression for a given block utilizes information determined during the chroma compression process for that same block. In at least one mode of the invention, video compression is performed utilizing non-linear quantization, such as within a combination of linear and non-linear quantization. In a preferred implementation, quantization step sizes of different precisions are utilized when performing non-linear quantization.

In at least one mode of the invention, pixel prediction is performed during compression. Pixel prediction starts at an initial reference pixel selected in the middle of the block from which a right and left prediction direction are defined that can be processed in parallel as desired. It will be appreciated that by selecting the middle pixel (or close to the middle) to start prediction, then the reference pixel remains the same for both right and left directions of prediction. Prediction of pixel values is performed by predicting current pixel values based on previous pixel values, and during which the prediction of the two directions is independent, thus allowing the prediction process for right and left directions to be performed in parallel to thus reduce required processing time.

In at least one implementation, subblock partitioning is performed according to a desired configuration. To determine subblock partitioning a subblock cost value is first computed for at least a portion of the possible subblock configurations, after which subblock configurations whose cost exceeds a given cost threshold, and/or the number of bits available within the compressed block, are discarded.

In at least one embodiment of the invention, the input video data for the apparatus is received from an image sensor, such as may be integrated within a video or still camera, or other imaging device. The formatting of the input video data is configured to include both luminance and chrominance information.

In at least one object of the invention, compression and decompression are performed toward reducing bus bandwidth and/or video memory requirements, such as utilized as a form of YUV video data preprocessing performed prior to encoding of the blocks which are retrieved from memory in an encoder specific manner which is typically non-sequential (e.g., not in block number order). Alternatively, or additionally, compression and decompression according to the invention may be practiced when transmitting compressed video data over a network prior to decompression, or for storing video data to a media device prior to decompression.

One embodiment of the invention is a video encoder apparatus for encoding YUV video data, comprising: (a) a video memory configured for communicating video pixel data with one or more video modules; (b) a video compression module coupled through a signal bus to the video memory and configured for, (b)(i) compressing luminance and chrominance YUV input video data using a quantizer into compressed video data having a reduced number of bits per pixel, without the need of referencing data from other blocks; (b)(ii) storing the compressed video data within the video memory; and (c) a video decompression module configured for block retrieval from video memory in any desired order and decompression of compressed video data into decompressed video data which has the same format and approximates the original video data which was received and compressed by the video compression module; and (d) an encoding module which non-sequentially selects video data blocks from the memory and which receives and encodes the decompressed video data.

One embodiment of the invention is a method of compressing and decompressing YUV video data, comprising: (a) compressing input video data, by a compression ratio R using a quantizer, into compressed video data blocks having a reduced number of bits in luma and/or chroma for each block of video data; (b) wherein the compression of the input video data is performed without utilizing data from pixels outside of the block being compressed; (c) storing the compressed video data into video memory; and (d) decompressing the compressed video data for any of the video data blocks, selected in sequential or non-sequential order, to generate a decompressed video data output. In one implementation, the compression and decompression is performed in combination with an encoding process for the video data wherein non-sequential blocks of video data from the memory are selected, decompressed according to the invention and received for encoding.

One embodiment of the invention is a method of compressing and decompressing YUV video data, comprising: (a) compressing input video data, by a compression ratio R using a quantizer, into compressed video data blocks having a reduced number of bits in luma and/or chroma for each block of video data; (b) the compression performed on each block of video without utilizing data from outside of each block being compressed; (c) selecting either linear or non-linear quantization for each subblock within a given block to which the compression is performed; (d) storing the compressed video data into video memory; and (e) decompressing the compressed video data for any of the video data blocks retrieved from video memory, selected in any order, to generate a decompressed video data output.

One embodiment of the invention is a method of compressing and decompressing YUV video data, comprising: (a) compressing input video data, by a compression ratio R using a quantizer, into compressed video data blocks having a reduced number of bits in luma and/or chroma for each block of video data; (b) the compression is performed on the video data blocks without utilizing data from blocks outside of the block being compressed; (c) estimating luma texture complexity and chroma texture complexity; (d) selecting the same or different compression levels within luma and chroma while maintaining overall compression ratio R; (e) selecting either linear or non-linear quantization for each subblock within a given block to which compression is to be performed in response to characteristics detected in the block; (f) wherein during compression, the luma compression process utilizes information from the chroma compression process for that same block; (g) storing the compressed video data into video memory; (h) retrieving blocks of video data from video memory in any desired order and at any time subsequent to said storing of the compressed video data; (i) decompressing the compressed video data for retrieved blocks to generate a decompressed video data output.

The present invention provides a number of beneficial aspects which can be implemented either separately or in any desired combination without departing from the present teachings.

An aspect of the invention comprises an apparatus and method for the compression and decompression of YUV video data blocks.

Another aspect of the invention is that each compressed block does not overlap with other compressed blocks, and each compression block is compressed independently without referring to information from other blocks.

Another aspect of the invention is that, if the number of bits of the compressed information after compression is smaller than the target bits which comport with the desired compression ratio (R), then padding bits are used to extend the total output bits up to a desired number so that it remains fixed. Since the size of generated bits of each compression block is fixed, a compressed block at any position can be accessed and decompressed without referring to information in other blocks. Therefore, using the proposed method, access to video data and decompression of video blocks from a random position within the video can be readily performed, such as where an arbitrary area in a frame needs to be accessed for video processing, or encoding.

Another aspect of the invention is that luma data is compressed by using information determined as a result of chroma compression. Chroma is compressed first in this method according to the invention. After chroma compression, at least a portion of the information is transferred to a luma module in preparation for luma compression. The information bits can be retained for any desired period, or number of bits, after compression. Luma compression utilizes this information in compression. Finally, the compressed luma and chroma data is packed into one compressed block. The data size is guaranteed to be within the range specified by the target compression ratio.

Another aspect of the invention is that of first estimating, before compression, the texture complexity of luma and chroma compression blocks. Each compression module (luma and chroma) can automatically provide different levels (or degrees) of compression (e.g., weak, medium, or strong). The degree of compression is determined based on texture complexity, wherein a number of bits is then allocated for luma and chroma fields within the compressed block.

Another aspect of the invention is the utilization of an overall compression ratio given by R which controls the overall extent to which the video blocks are compressed. The value of R is exemplified as a ratio (number of input bits/number of output bits) for a given block. A ratio R of two (2) indicates that the compressed blocks contain one-half the number of bits utilized by the original data. It should be appreciated, however, that compression can be expressed in any desired format, such as any form of ratiometric designation, or with regard to selecting a given number of bits per block of the video output.

Another aspect of the invention allows selecting the extent to which Y, U, and V are compressed while holding to an overall compression ratio R. It should be noted that it does not mean the compression ratio is fixed across Y, U and V for an individual compression block, as it possible to allocate bits based on different compression ratios between chroma and luma.

Another aspect of the invention is the process of automatically determining the best compression ratio between luma and chroma while maintaining an overall compression ratio R. In general terms, the human eye is more sensitive to signal noise in luma than signal noise in chroma. Therefore, the preferred bit allocation strategy minimizes bit use for chroma, and maximizes bit use in luma. However, when chroma is found to have a certain level of complexity, in particular when it is found to be very complex, then at least one embodiment of the invention allows chroma to use a sufficient number of bits to prevent the appearance of visual artifacts. This maximization and minimization of bit use is determined in response to information obtained about luma and chroma texture complexity.

Another aspect of the invention selects different levels of compression. For example, low, middle and high quality modes of compression can be defined. The low quality mode is based on utilizing a high compression ratio, while the high quality mode utilizes a low compression ratio. In one aspect of the invention, a determination is made of the final best compression mode. It should be noted that compression level can be defined both in luma and chroma compression, wherein the portion of the block used by luma and the portion used by chroma is determined.

Another aspect of the invention is that the decision to determine a best compression mode is made by information obtained about texture complexity and the number of available bits.

Another aspect of the invention starts pixel prediction from the middle pixel of a string of pixels instead of the first pixel, wherein other pixels are predicted in relation to that starting pixel. Two prediction directions are computed, wherein the required processing time can be reduced.

Another aspect of the invention is subblock partitioning in response to quantization and subblock configuration decisions. Overall compression ratio R is determined in response to the number of pixels N used for luma and the number of pixels M used for chroma compression (U and V, or Cr and Cb). For a given (N, M) luma and chroma compression value, there exists a number of different subblock configurations. A subblock size decision module, or similar, determines an optimum subblock configuration under a given set of inputs and conditions.

Another aspect of the invention is for a cost to be computed for at least a portion of the different possible subblock configurations, (e.g., or all different subblock combinations) based on the given information, such as that received from Information_from_chroma, R, QP precision, and the like. By way of example, the cost can be an estimated in terms of the number of generated output bits. If the number of output bits for a given subblock configuration exceeds a threshold cost value, preferably given by the number of bits available, then that subblock configuration is discarded and the next possible subblock configuration is checked. In at least one implementation, if none of the possible configurations are available, then the N pixels of the original compression block are used as a subblock.

Another aspect of the invention is the selecting of either linear or non-linear quantization during block compression.

Another aspect of the invention is estimation of a quantization parameter (QP) for use in non-linear quantization as described herein.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 12 is a block diagram of selecting a subblock size according to an aspect of the present invention.

FIG. 13 is a flow diagram of determining subblock size according to an aspect of the present invention.

FIG. 14 is a flow diagram of non-linear quantization in response to estimated QP value and residue data according to an aspect of the present invention.

FIG. 15 is a flow diagram of QP estimation according to an aspect of the present invention, shown performed in response to determining residue data.

DETAILED DESCRIPTION OF THE INVENTION

Referring more specifically to the drawings, for illustrative purposes the present invention is embodied in the apparatus generally shown in FIG. 2 through FIG. 17. It will be appreciated that the apparatus may vary as to configuration and as to details of the parts, and that the method may vary as to the specific steps and sequence, without departing from the basic concepts as disclosed herein.

YUV Video Data Compression/Decompression Method

Figure 1:
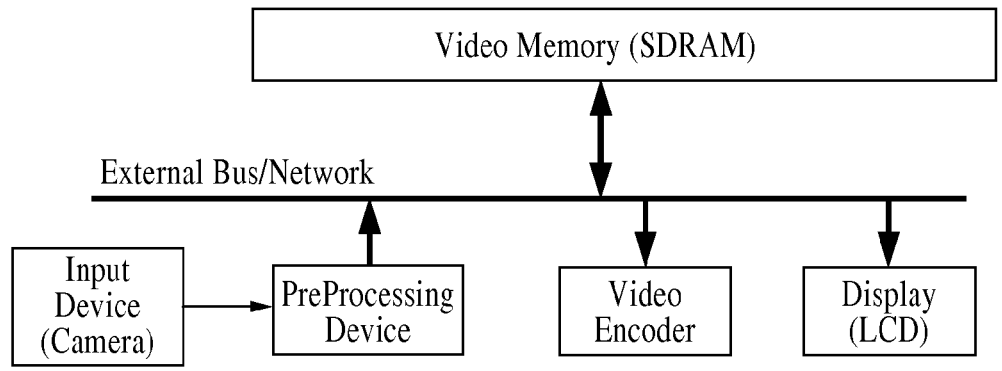
FIG. 1 is a block diagram of a conventional video or still camera architecture, showing storage of image data after preprocessing within a video memory.
Figure 2:
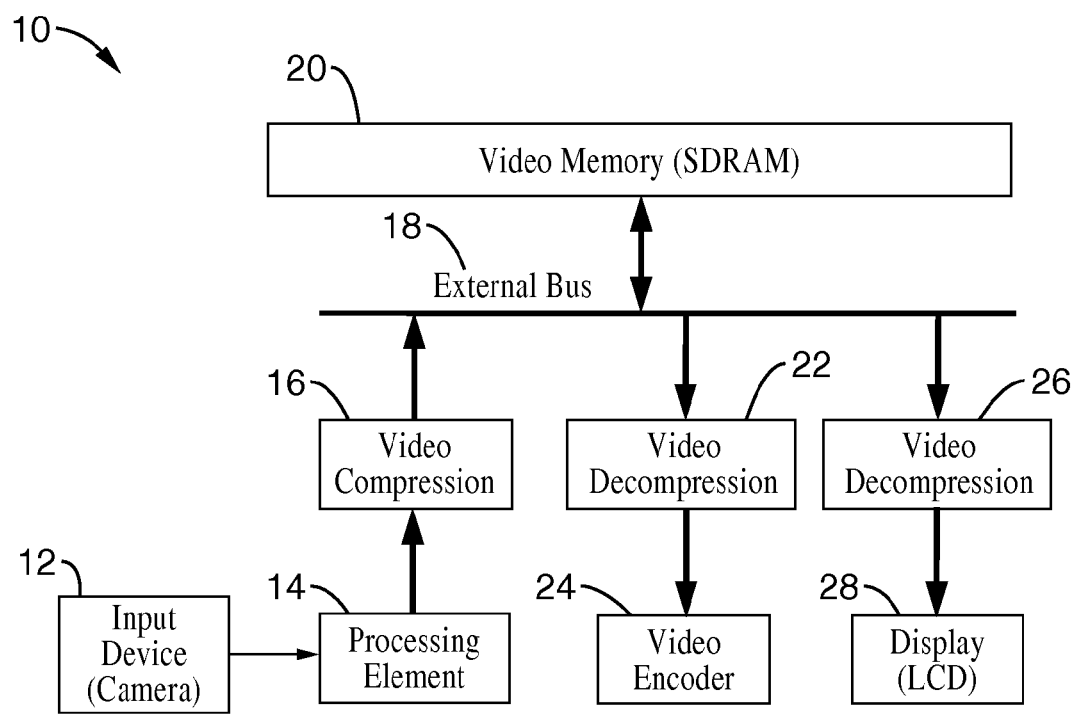
FIG. 2 is a block diagram of a video or still camera architecture according to an aspect of the present invention, showing compression of image data prior to storage in video memory.

FIG. 2 illustrates an embodiment 10 of the present invention for performing compression and decompression of YUV (or YCrCb) video data. Compression may be utilized to render any number of benefits associated with a given application, for example in order to reduce bus bandwidth and video memory requirements.

The apparatus and method of the present invention receives input from video device 12, processes the data 14, and then compresses the video data 16 before storing it, such as over a bus 18, into an external video memory 20. A video encoder 24 or display device 28 retrieves the compressed video from video memory and decompresses it 22, 26 prior to utilizing the video data. Since the video data is compressed prior to storage in the video memory, the required bus bandwidth is much lower than the original, while the necessary size of the video memory (e.g., SDRAM) is similarly reduced.

Figure 3:
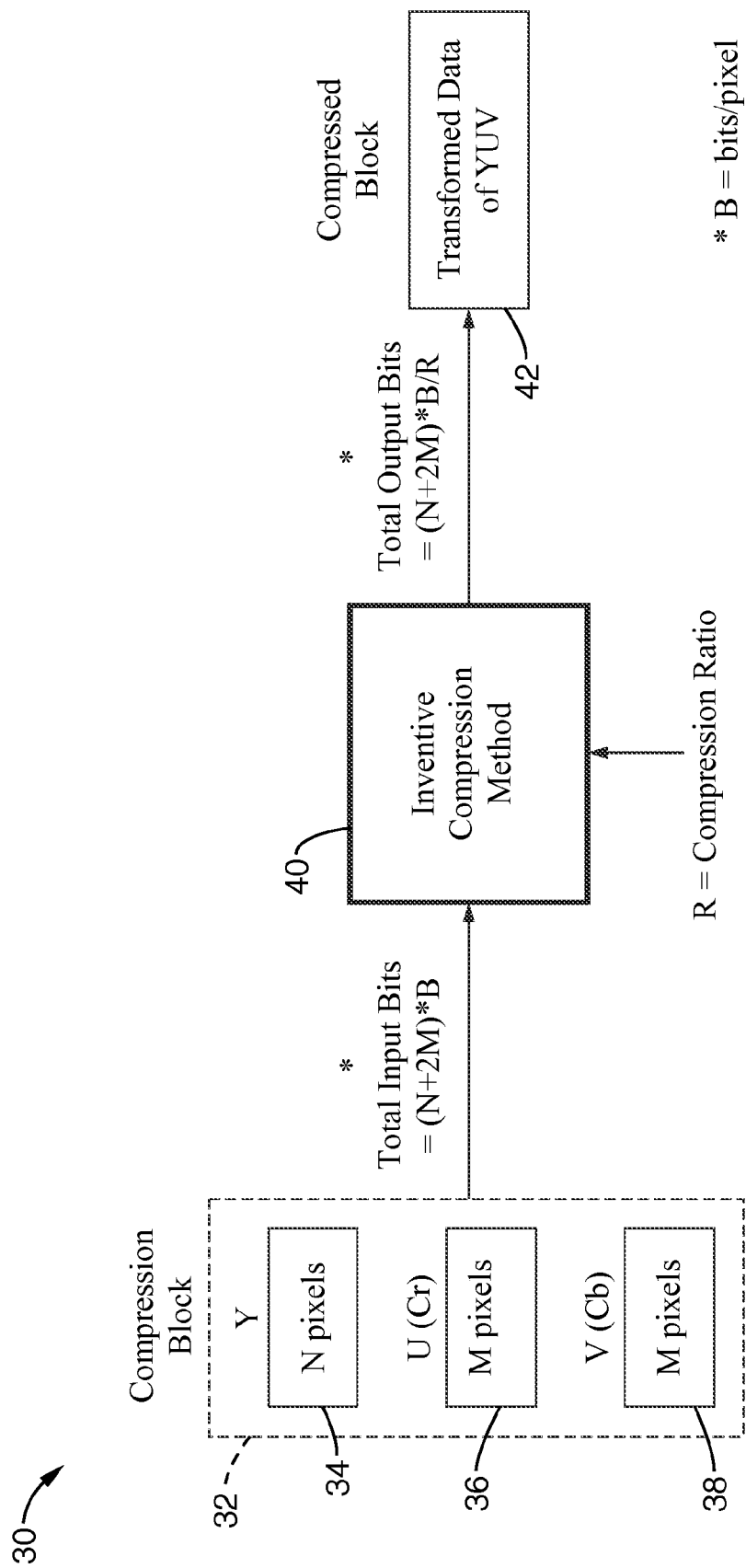
FIG. 3 is a block diagram of a block being compressed according to an aspect of the present invention.

FIG. 3 illustrates an example embodiment 30 of a YUV, or similar block, being compressed according to the present invention. The input video data format of compression block 32 of the inventive compression method is YUV (or YCrCb). During the compression process, a frame (that in this example consists of video data of Y, Cr, and Cb) is partitioned to a set of compression blocks. A compression block is defined as N pixels for Luminance (Y) 34 and M pixels each for chrominance (Cr, Cb) 26, 38 as shown in the figure. Therefore, the total number of pixels in each compression block is (N+2M). If B bits are utilized to represent a pixel, then the total number of bits will be (N+2M)×B bits.

The compression block does not overlap with other compression blocks, and each compression block is compressed independently without referring to information in other blocks.

Once a compression ratio, R is received for input, one implementation of compression method 40 generates fixed size compressed blocks 42. The number of the generated bits is computed by:

Total Output Bits=(N+2M)*B/R.

For example, if R is 2, the total generated output bits will be half of the original number of bits of YUV.

If the number of bits of the compressed information after compression is smaller than the target bits specified by R, then padding bits are preferably inserted to maintain a fixed number of total output bits at all times. Since the size of generated bits of each compression block is fixed, a compressed block at any position can be retrieved and decompressed without referring to information in other blocks. Therefore, using the inventive method, access to the video data at a random position (as a compression block unit) is possible. This is necessary in applications where an arbitrary area in a frame needs to be accessed for other video processing.

Figure 4:
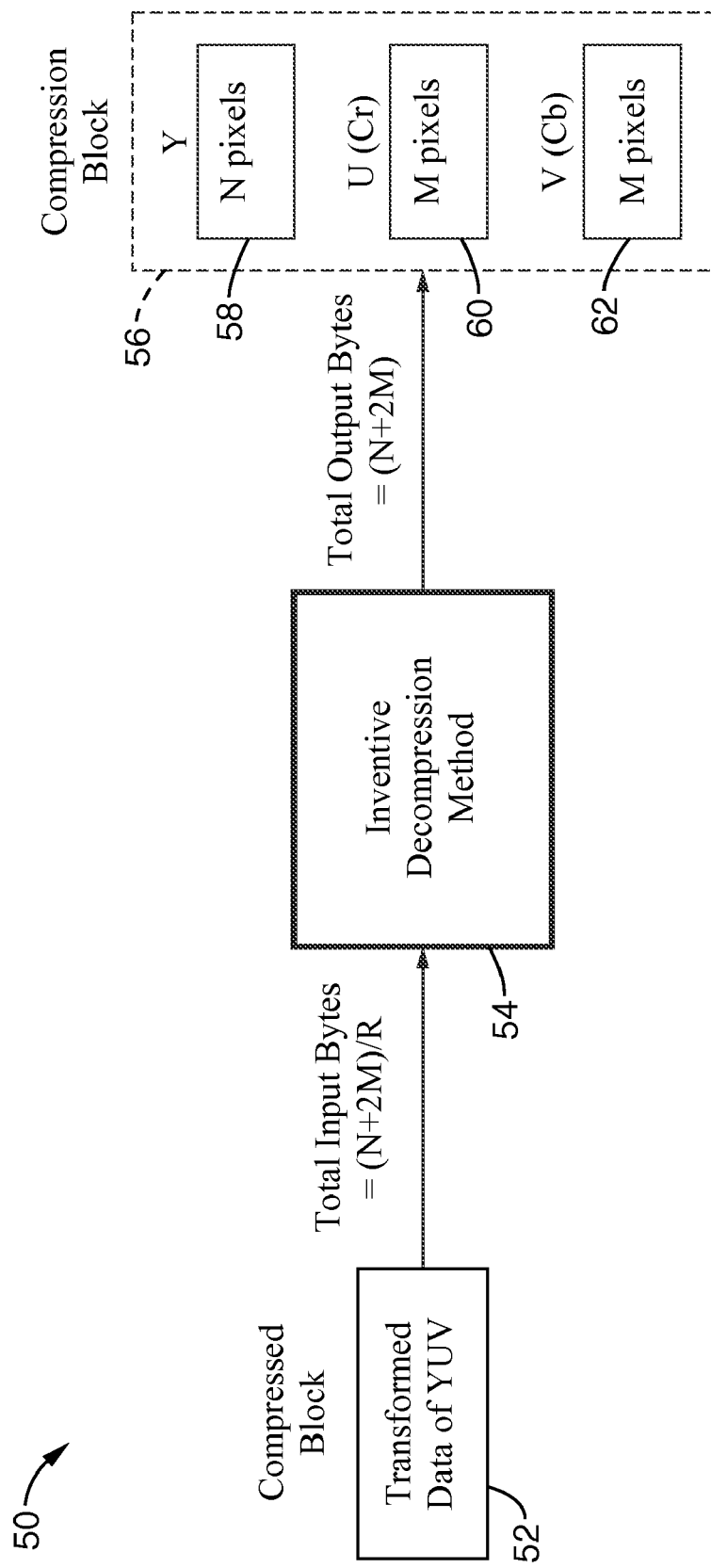
FIG. 4 is a block diagram of block decompression according to an aspect of the present invention.

FIG. 4 depicts an embodiment 50 of the decompression process. The decompression method accepts a compression block 52 which is decompressed 54 to a compression block 56 having returned to the original YUV resolution, such as having N pixels for Y 58, M pixels for U 60, and M pixels for V. The decompressed YUV data can also be utilized in other devices for video processing. Since the dimension of video data after decompression is the same as the original, other processing devices will not be able to recognize, based on video formatting, any difference introduced by the compression algorithm.

Figure 5:
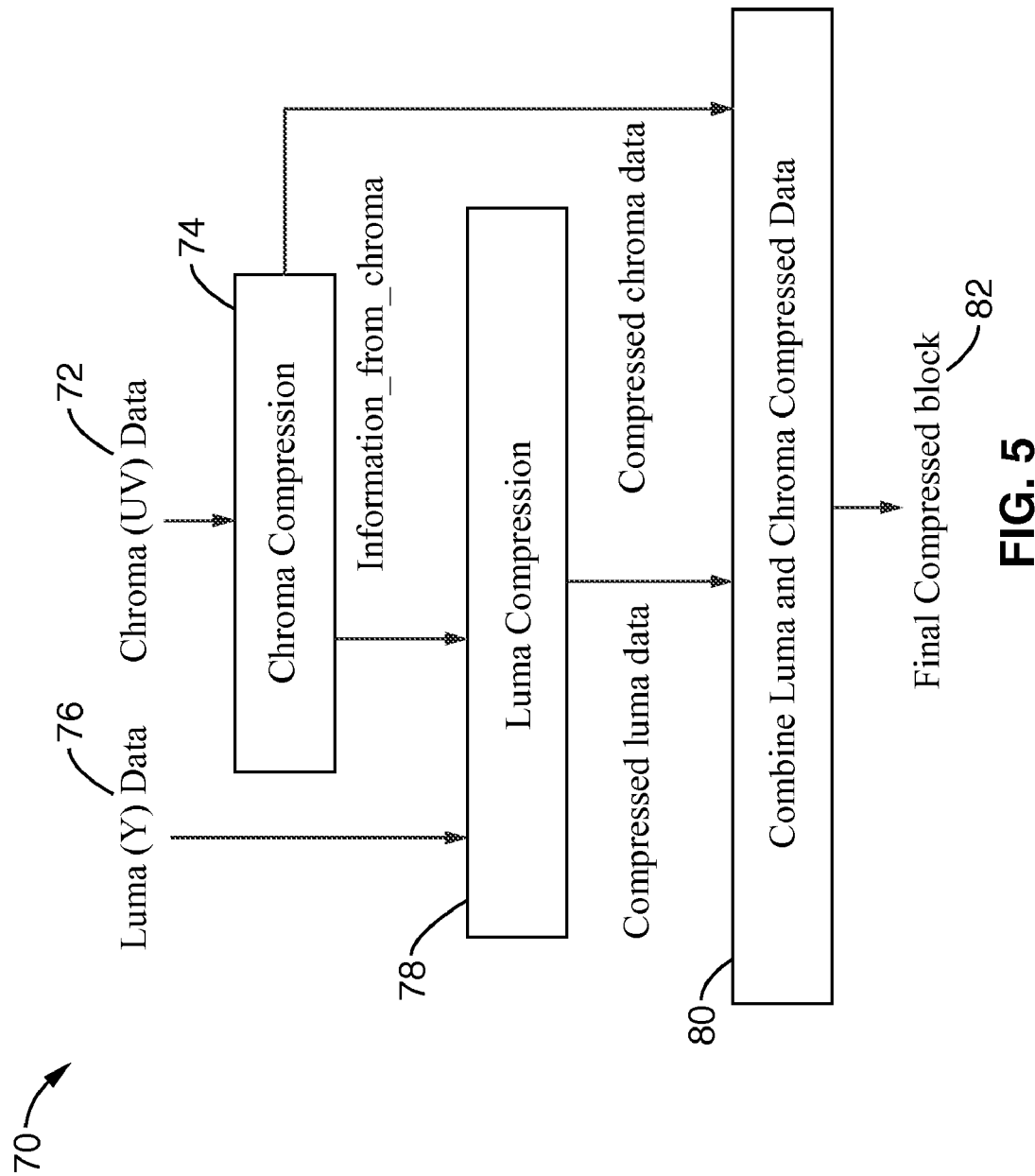
FIG. 5 is a flow diagram of chroma and luma compression according to an aspect of the present invention, showing information from chroma compression utilized in the luma compression process.

FIG. 5 illustrates an embodiment 70 of block compression and the relation between luma and chroma compression modules. In at least one implementation, luma compression is performed in response to information received during compression of chroma for the same block. It will be seen that chroma (UV) data 72 is received first for chroma compression 74, wherein information from chroma compression, Information_from_chroma, is transferred and utilized in combination with luma (Y) data 76 to perform luma compression 78. It is thus preferable that chroma compression be performed first according to this inventive method. It should be appreciated that the information from chroma can be retained for any desired time, or number of bits following compression, such as for use during luma compression. Finally, the compressed luma and chroma data is packed, as represented by block 80, into one compressed block 82. According to at least one preferred implementation, the data size is guaranteed to be within the range specified by the target compression ratio.

Figure 6:
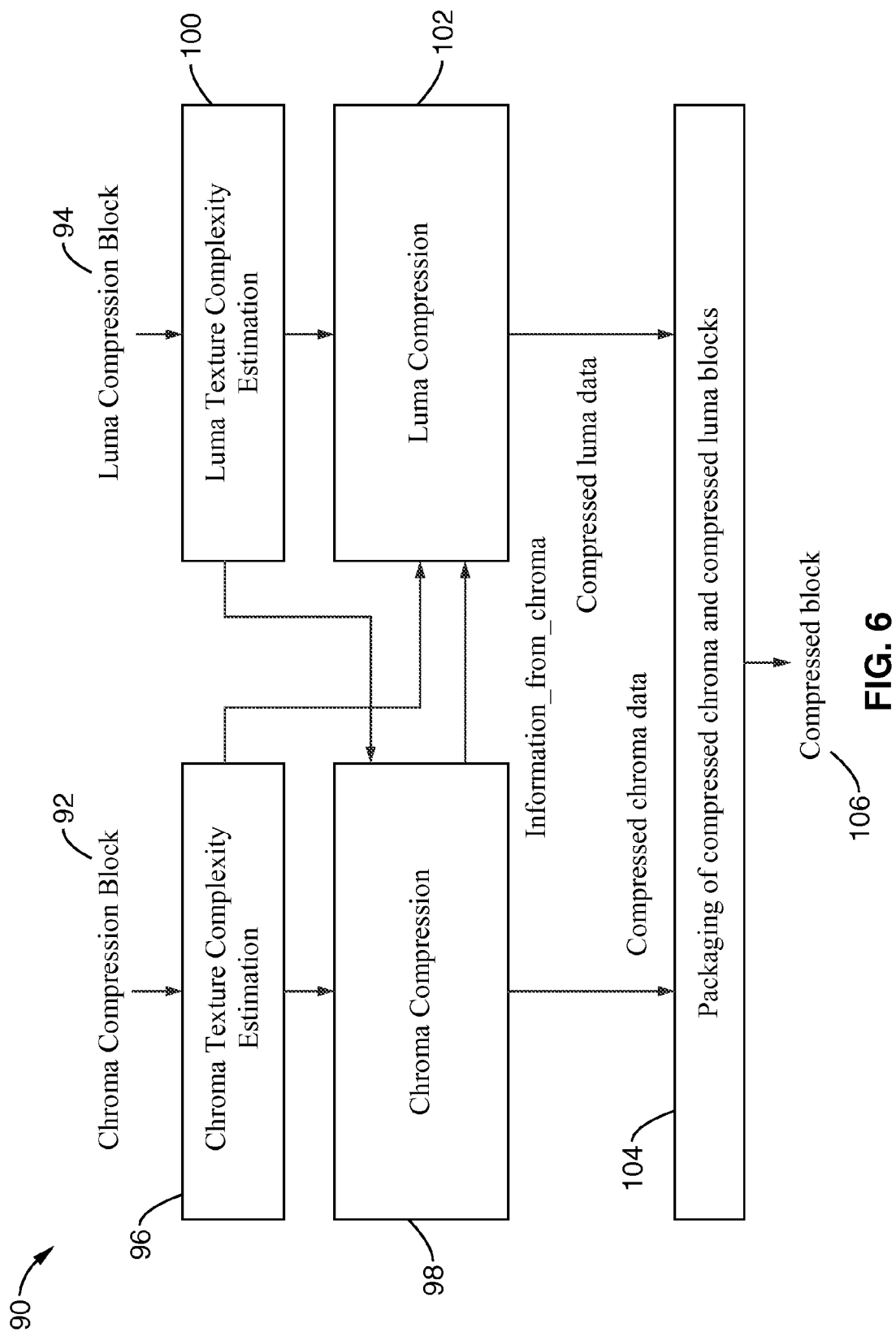
FIG. 6 is a flow diagram of overall compression according to an aspect of the present invention.

FIG. 6 illustrates an embodiment 90 of the overall inventive compression method. The receipt of a chroma compression block 92 and luma compression block 94 are shown. Prior to compression, the texture complexity of chroma is estimated 96 and the texture complexity of luma is estimated 100 (no specific order implied). Chroma compression 98 and luma compression 102 are performed with data received from both luma and chroma complexity estimation, while luma compression additionally receives information from chroma compression. Compressed luma and chroma data are then received and packaged 104 and a compressed block 106 generated.

Returning to consider the compression process, it will be appreciated that each compression module (luma and chroma) in the present invention may provide different levels (degrees) of compression (e.g., weak, medium, strong). According to at least one implementation of the invention, the degree of compression is preferably selected in response to the level of texture complexity.

The compression ratio represented by variable R controls the compression ratio of Y, U, and V compression blocks. It should be noted that it is not inferred from this that Y, U and V are subject to a fixed compression of R; because Y, U and V (or Y, Cr and Cb) can each be separately compressed to any desired ratio, insofar as the resultant compression for the block follows the overall compression ratio R. Therefore, it is possible to allocate bits based on different compression ratios between chroma and luma.

In one implementation of the invention, the embodied method attempts to optimize (i.e., find the best compression ratio within the confines of the technique and available information) compression ratio between luma and chroma while maintaining the overall compression ratio at R. This aspect of the invention takes into account that the human eye is generally more sensitive to noise in luma than to noise within chroma. Therefore, in the preferred bit allocation strategy, chroma utilizes a minimal number of bits so that bit use in luma can be maximized. However, in certain cases such as where chroma is found to be very complex, then a mode of the invention allows chroma to utilize a sufficient number of bits so to prevent visual artifacts.

In at least one implementation, the ratio of bit allocations is selected on the basis of a determination of luma and chroma texture complexity. The texture complexity in FIG. 6 can be obtained, for example, computing the average of residues of the compression block.

Figure 7:
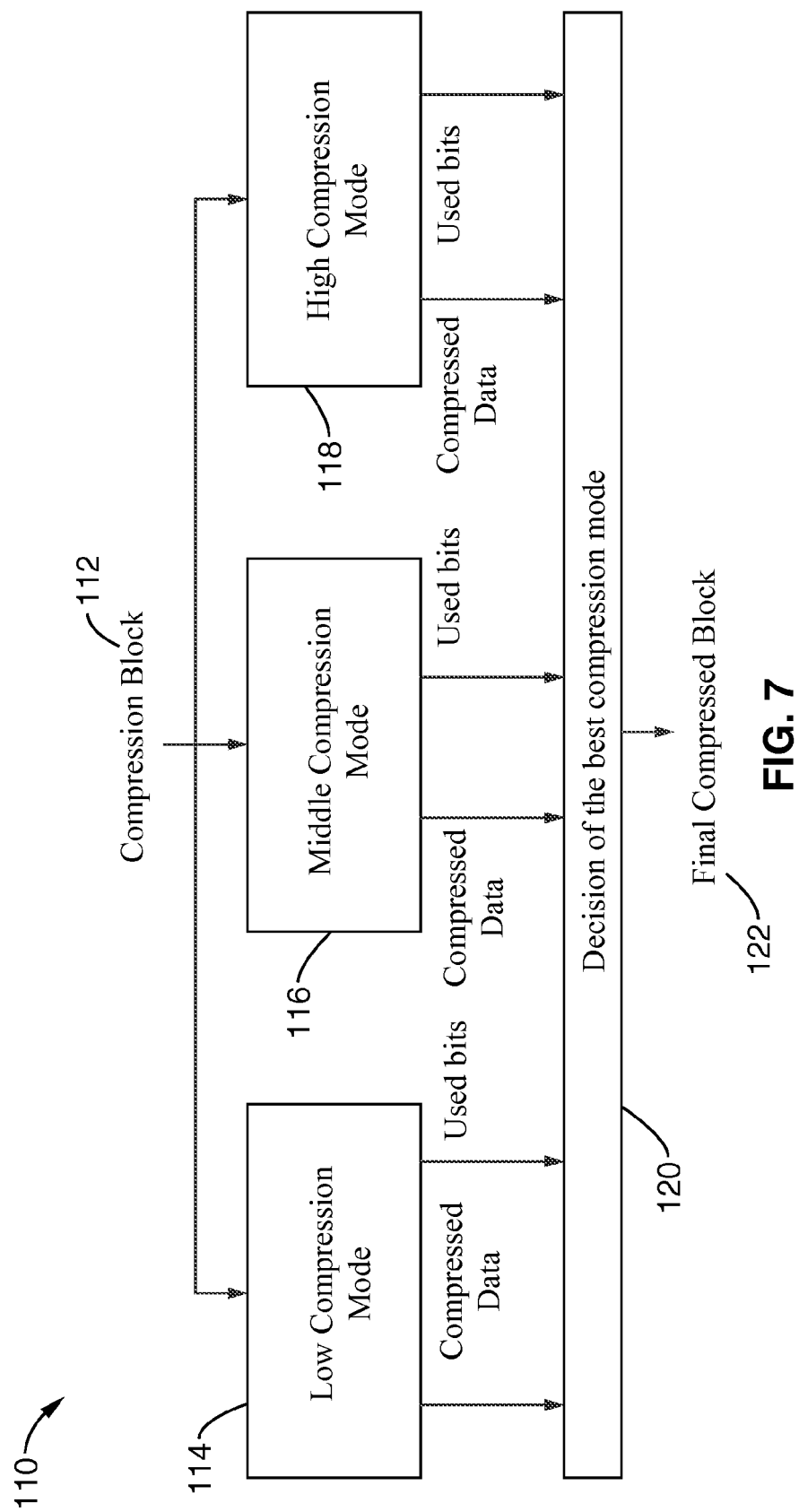
FIG. 7 is a flow diagram of supporting different compression modes according to an aspect of the present invention.

FIG. 7 illustrates an embodiment 110 of an inventive method to support different compression quality modes depending on compression level. For example, a compression block 112 can be subject to, low 114, medium 116, and high quality 118 compression modes according to the invention. The low quality mode arises from use of a high compression ratio, while the high quality video mode results from the use of a low compression ratio. In one preferred implementation, a process 120 is executed for selecting a final best compression mode from which a final compressed block 122 results. It should be recognized that the compression level can be defined both in luma and chroma compression modes.

One example of implementing the different levels (modes) of compression is through utilizing bit precision of output quantization. For low compression modes, higher precisions can be utilized, while lower precisions can be utilized with high compression modes. Depending on the desired compression ratio, the quantization precisions can be predetermined at different levels. As shown in FIG. 7, the determination of the best compression mode is generated by the system in response to information on texture complexity and available bits.

Figure 8:
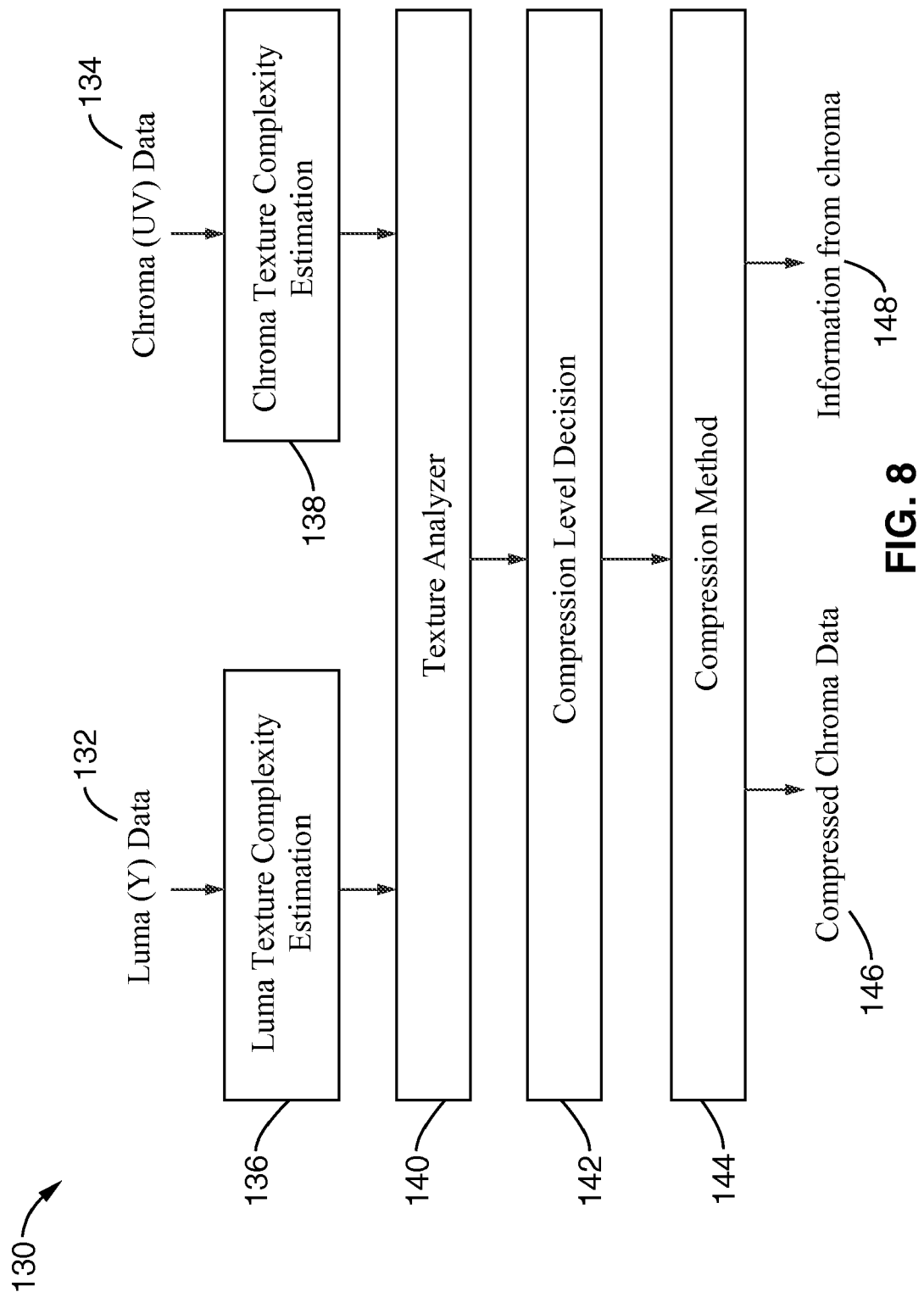
FIG. 8 is a flow diagram of making compression level decisions according to an aspect of the present invention, showing estimation of texture complexity and analysis in preparation of deciding on a compression level and performing the compression method.

FIG. 8 illustrates an example embodiment 130 of making compression level decisions according to the present invention. Luma (Y) data 132 and chroma (UV) data 134 are received respectively for luma texture complexity estimation 136 and chroma texture complexity estimation 138. These complexity estimates are described in the following sections. Luma and chroma texture estimates are then utilized by a texture analyzer 140, the output from which is utilized in making compression level decisions in block 142 and then performing the compression method as per block 144 with a compressed chroma data output 146 and output of information from chroma 148. The compression method is described in FIG. 5 while the texture analysis and compression level decisions are described below.

Luma Texture Complexity Estimation

The following pseudo code illustrates, by way of example and not limitation, the estimation of luma texture complexity.

For each subblock, luma texture complexity is analyzed and the complexity is estimated as follows.

```
index x: index of pixel position
index bp: index of subblock position
Luma_Texture_Complexity (LTC)
   This value indicates the complexity of the current luma compression
      block. Three different levels of complexity; weak, medium and
      strong can be defined.
   The detection method:
      For each subblock, compute Residual[x] = Current pixel[x] –
         predicted pixel[x];
      For each subblock, find maximum of Residual[x] within subblock,
         say max_Residual[bp];
      Compute average_residue of max_Residue[bp] over
         whole compression block;
      If average_residue < Threshold_1:
   The whole luma_block is considered as 'weak complex'.
If average_residue ≥ Threshold_2:
   Compute the number of subblocks that max_Residue[bp] >
      Threshold_3;
   If the computed number < Threshold_4;
      Then, whole luma_block is considered as 'medium complex block'.
      Else, the whole luma block is considered as 'strong complex block'.
```

Chroma Texture Complexity Estimation

The following pseudo code illustrates, by way of example and not limitation, estimation of chroma texture complexity. For each subblock, chroma texture complexity is analyzed and the complexity is estimated as follows.

```
Chroma Texture Complexity (CTC)
   The detection method:
      For each subblock, compute Residual[x] = Current pixel[x] –
         predicted pixel[x];
      If any Residual[x] < Threshold_1:
         If the residue value at the subblock boundary is larger than
            Threshold_2;
         Then, the subblock is considered as 'low_complex'.
         Else, the 4×1 chroma subblock is considered as 'high_complex'
```

Compression Level Decision

By way of example, and not limitation, the compression level decision can be implemented according to the pseudo-code below.

```
If (CTC == high)
   If(LTC ==low)
      Chroma_Compression_Level   = LOW_COMPRESSION_MODE
      Luma_Compression_Level     = HIGH_COMPRESSION_MODE
   Else if(LTC == medium)
      Chroma_Compression_Level   = HIGH_COMPRESSION_MODE
      Luma_Compression_Level     = MIDDLE_COMPRESSION_MODE
   Else (LTC==high)
      Chroma_Compression_Level   = LOW_COMPRESSION_MODE
      Luma_Compression_Level     = HIGH_COMPRESSION_MODE
Else if (CTC == low)
   If(LTC ==low)
      Chroma_Compression_Level   = LOW_COMPRESSION_MODE
      Luma_Compression_Level     = HIGH_COMPRESSION_MODE
   Else if(LTC == medium)
      Chroma_Compression_Level   = MIDDLE_COMPRESSION_MODE
      Luma_Compression_Level     = MIDDLE_COMPRESSION_MODE
   Else (LTC==high)
      Chroma_Compression_Level   = HIGH_COMPRESSION_MODE
      Luma_Compression_Level     = MIDDLE_COMPRESSION_MODE
```

Compression Method in Each Level

Figure 9:
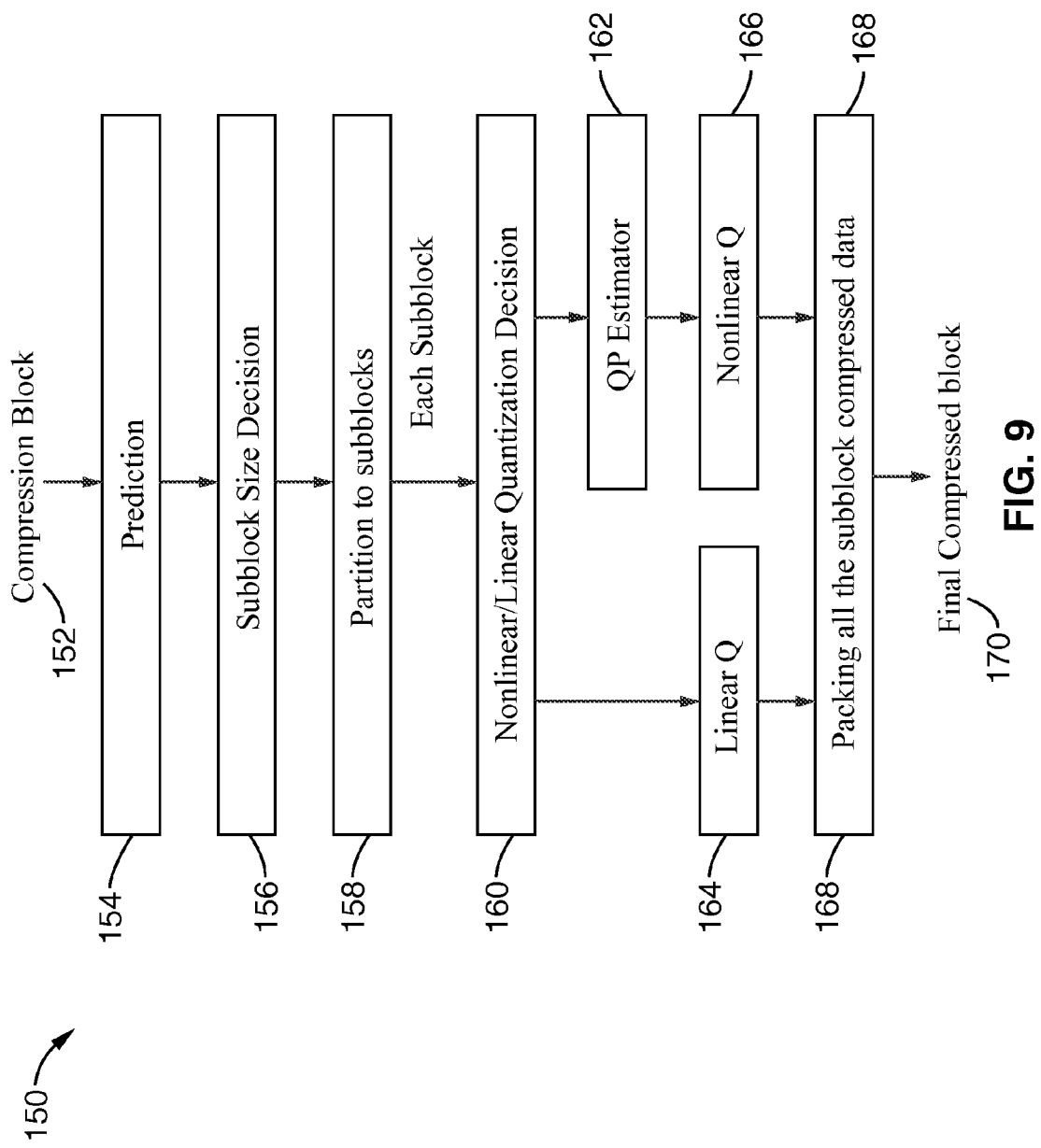
FIG. 9 is a flow diagram of a compression method according to an aspect of the present invention, showing either linear or non-linear Q being performed for a block in response to a quantization decision.

FIG. 9 illustrates an example embodiment 150 of an inventive compression method. A compression block 152 is received by a prediction process 154 which predicts the current pixel value based on previous pixels. Once the predicted value is obtained, the residue value (difference between the current pixel and predicted pixel) is computed in the prediction process 154. A subblock size decision process 156 determines an optimal subblock size based on texture complexity and available bits budget. Once the subblock size is decided in 156, the set of residue data is partitioned at block 158 into smaller size arrays referred to as subblocks. A Quantization process 160 is applied to each subblock of residue data to reduce the output bits. Therefore, each subblock can be quantized using a unique QP (Quantization Parameter) value. The figure shows that the decision is made to perform a linear quantization 164, or estimate a quantization parameter (QP) 162 and then perform a non-linear quantization 166. In either case the subblock results are packed 168 to yield a final compressed block 170.

The prediction implies the current pixel is predicted from previous pixels. The predicted pixel is utilized for computing a 'residue' between the actual current pixel value and the predicted value. In the inventive method, the residue will be quantized and coded in later stages.

Prediction of $x[n]=F(x[n-1], x[n-2], \ldots)$

Residue of $x[n]=abs(x[n]-\text{Prediction of } x[n])$

Figure 10:
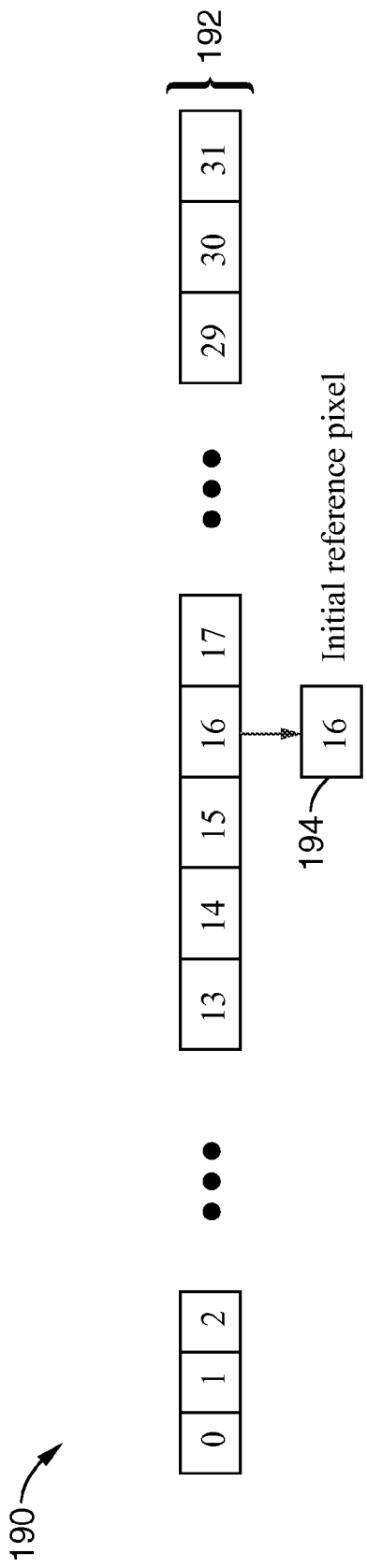
FIG. 10 is a pixel diagram of pixel prediction according to an aspect of the present invention, showing selection of a reference pixel in the middle of the pixels.
Figure 11:
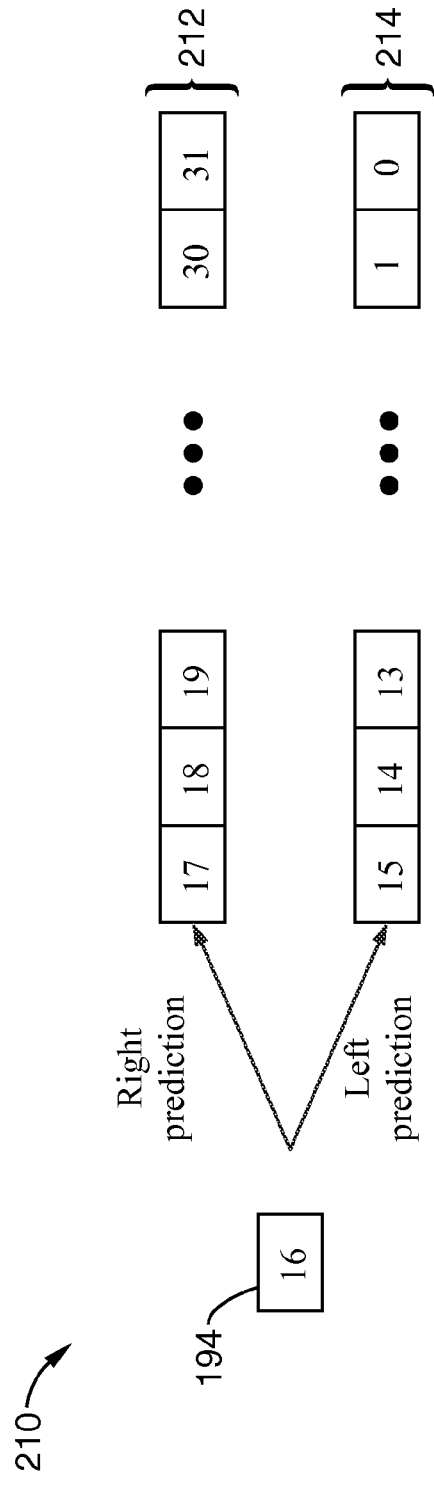
FIG. 11 is a pixel diagram of right and left prediction directions in response to selection of a reference pixel as shown in FIG. 10.

FIG. 10 and FIG. 11 illustrate mechanisms for initial pixel prediction 190 and for supporting two prediction directions 210, respectively. It will be appreciated that the pixel data set may be of any size, with the example data set being shown for simplicity by way of example and not limitation. For simplicity of explanation, a one dimensional data set will be described, although the mechanisms can also be applied to two-dimensional data. Within these figures, the number in the box indicates the position of the pixels in the compression block.

It should be noted in FIG. 10 that prediction 190 is started from the middle pixel 194 of data 192 instead of the first pixel. The pixel at the approximate middle position (e.g., position 16) 194 is set as the initial reference pixel, with all other pixels predicted starting from this pixel. As shown in FIG. 11 the mechanism 210 supports two prediction directions which are given as a right direction 212 and a left direction 214. Since the reference pixel (i.e., pixel at position 16) does not change, the prediction of each of these two directions is independent. Therefore, it is possible to process the prediction in parallel for the right and left directions, whereby the required processing time can be substantially reduced.

A compression block is partitioned to subblocks. The purpose of subblock partitions is to allocate independent QP for each subblock. Since lower QP can be used to minimize the noise caused by quantization, the overall quality can be improved if divided into a number of smaller subblocks. However, if the number of subblocks is large, the overhead for the QP value increases.

Subblock Partitioning for Quantization and Subblock Configuration Decision

Given (N, M) pixels, there are many possible subblock configurations which can be utilized. A 'subblock size decision' module determines the best subblock configuration in response to the received parameters.

One example of subblock partitioning is based on the information obtained after chroma compression. In one aspect of the present invention, the chroma compression is carried out first wherein information from that process is made available for use during luma compression. For example, the number of total bits used in chroma compression and the chroma texture complexity can be considered as information_from_chroma.

FIG. 12 illustrates an embodiment 230 for making a subblock size decision within a subblock size decision module 232 in response to receipt of information_from_chroma, R, and QP_precision. Output of module 232 comprises a best subblock size, such as 2×2, 4×4, 8×8 and so forth.

FIG. 13 illustrates one possible implementation 250 of a 'subblock_size_decision' module. The decision module receives 252 information_from_chroma, R, and QP_precision for each possible subblock configuration. A cost is computed for each configuration (254, 260, 266) based on the given information. The cost value can be expressed as an estimated number of generated output bits. A decision ladder (256, 262) is shown wherein if the number of output bits is larger than that available, then that particular configuration is discarded and a check is performed on the next possible configuration. Alternative outputs are here exemplified as 2×2 subblock 258, 4×4 subblock 264, and so forth up to a no partition (N subblock) output 266. It will be seen that when none of the possible configurations are acceptable, then the N pixels of the original compression block are used 266 as a subblock with no partition 268.

It should be appreciated that the inventive method is configured to support two quantization processes, linear and non-linear quantization.

1. Quantization Parameter Estimation in Non-Linear Quantization

Given the set of possible QP values, the system could check all of the QP values for a proper fit. However, the computational complexity of an exhaustive search for QP is not efficient and has a high implementation cost.

FIG. 14 illustrates an embodiment 270 of a reduced complexity method to estimate QP value without searching all possible QP values. Residue data 272 is shown received by QP estimator 274. Both the QP value determined from estimation and the residue data are received by a non-linear Q process 276.

FIG. 15 illustrates an embodiment 290 of QP estimation shown in detail. The inventive QP estimator uses original pixel values with subblock residue data 292 utilized in finding a maximum residue value 294 in the subblocks. The maximum value is then utilized in determining quantization decision level 296. In other words, from the maximum residue value a maximum decision level can be found from which the best QP value can be determined 298. Table 1 shows one example of mapping maximum decision level and QP value.

In order to decide the QP value of two-bit Q non-linear quantization, the maximum of residual data using original data within 4×1 block is used (QP estimation). In Table 1 the mapping between the estimated QP and max_residual data within subblock are seen.

2. Linear/Non-Linear Quantization Decision

In this aspect of the present invention each subblock can be quantized n response to the selection of linear or non-linear quantization according to the inventive method. For example, in response to large residue values for a subblock the QP value also tends to be large, wherein significant quantization noise is introduced resulting in the creation of unwanted visual artifacts.

Figure 16:
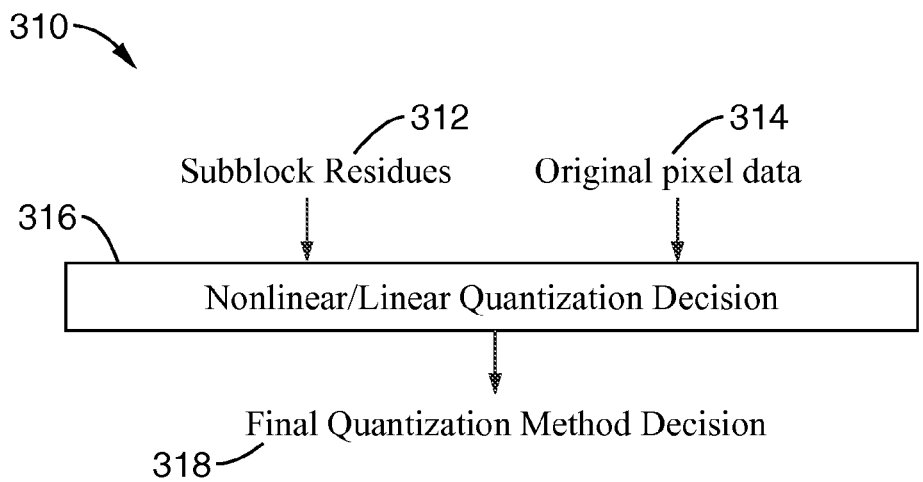
FIG. 16 is a block diagram of selecting linear or non-linear quantization according to an aspect of the present invention.

FIG. 16 illustrates an embodiment 310 of selecting non-linear or linear quantization, in response to the content of video data, in order to prevent visual artifacts from arising such as noise. In the figure, the example parameters that are shown being utilized in the selection are depicted as subblock residues 312 and original pixel data 314. However, any other parameters available at this stage can be used as well, within the quantization decision 316 to arrive at a final quantization method decision 318.

Figure 17:
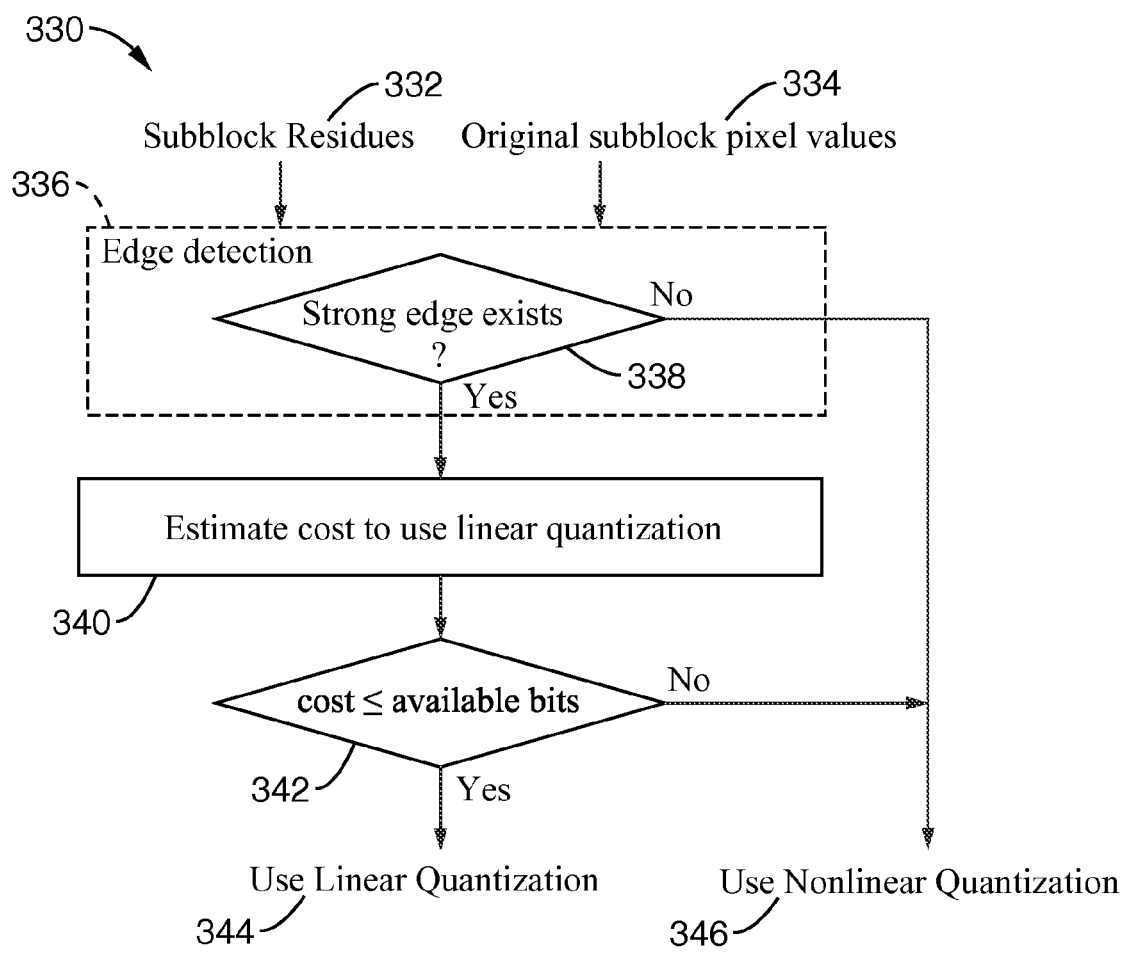
FIG. 17 is a flow diagram of deciding on linear or non-linear quantization according to an aspect of the present invention.

FIG. 17 illustrates an embodiment 330 of a 'non-linear/linear quantization decision' module. Data, such as subblock residues 332 and original subblock pixel data values 334 are received within an edge detection module 336. It should be appreciated that edge detection 336 can be implemented in any number of alternative ways using original pixels or residues, or similar values. For example, if the maximum residue in a subblock is larger than a threshold, it can be considered that a strong edge exists. If no strong edges are detected, as per step 338, then a decision is made to use non-linear quantization 346. Otherwise a cost is estimated 340 to use linear quantization, which is then compared at 342 with the available number of bits to yield a decision to use linear quantization 344. If the cost is greater than the available bits, nonlinear quantization 346 is selected.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Example Mapping of Maximum Decision Level And QP Value

| | DL | | | | | | | |
|---|---|---|---|---|---|---|---|---|
| | D0 | D1 | D2 | D3 | D4 | D5 | D6 | D7 |
| MRR | $r < 4$ | $4 \leq r < 4$ | $8 \leq r < 16$ | $16 \leq r < 32$ | $32 \leq r < 48$ | $48 \leq r < 64$ | $64 \leq r < 128$ | $128 \leq r < 256$ |
| E. QP | 0 | 1 | 2 | 3 | 4 | 5 | 6 | 7 |

DL—Decision Level;
MRR—Maximum Residue Range;
E. QP—Estimated QP

What is claimed is:

1. An apparatus for compressing and decompressing YUV video data, comprising:
    (a) a video memory configured for communicating video pixel data with one or more video modules;
    (b) a video compression module coupled through a signal bus to said video memory and configured for,
        compressing blocks of luminance and chrominance YUV input video data using a quantizer into compressed blocks within a compressed video data having a reduced number of bits per pixel,
        wherein block compression is performed without utilizing pixel data outside of each block,
        storing said compressed video data within said video memory; and
    (c) a video decompression module configured for retrieving blocks of compressed video data in any order and for decompressing the compressed video data stored in said video memory into decompressed video data which has the same format and approximates the original video data which was received and compressed by said video compression module;
    said video decompression module configured to output said decompressed video data;
    wherein said apparatus is configured for performing pixel prediction during compression, said pixel prediction starting at an initial reference pixel selected in the middle of the block and defining a right and left prediction direction which can be processed in parallel as desired; and
    wherein the reference pixel remains the same for both right and left directions of prediction.

2. An apparatus as recited in claim 1, wherein said compression is performed according to an overall compression ratio R, which controls the extent of block compression.

3. An apparatus as recited in claim 2, wherein said overall compression ratio R can be expressed ratiometrically, or in terms of the number of bits contained in the resultant block.

4. An apparatus as recited in claim 2, wherein said apparatus is configured for selecting the same or different compression levels for luma and chroma while maintaining overall compression ratio R.

5. An apparatus as recited in claim 4, wherein unless chroma has a high complexity level, the extent of said compression is selected to minimize bit use in chroma, and maximize bit use in luma.

6. An apparatus as recited in claim 1, wherein said apparatus is configured for estimating texture complexity of compression blocks prior to said compression.

7. An apparatus as recited in claim 6, wherein the number of bits to be allocated for luma and chroma within the compressed block are determined in response to estimating texture complexity.

8. An apparatus as recited in claim 1, wherein said apparatus is configured for padding the compressed video data with padding bits to maintain a fixed size for the compressed blocks.

9. An apparatus as recited in claim 1, wherein Luma compression for a given block utilizes information from Chroma compression of that same block.

10. An apparatus as recited in claim 1, wherein said pixel prediction predicts current pixel values based on previous pixel values.

11. An apparatus as recited in claim 1, wherein during said pixel prediction the prediction of the two directions is independent, whereby the prediction process for right and left directions is performed in parallel and the required processing time will be reduced to one-half.

12. An apparatus as recited in claim 1, wherein said apparatus is configured for subblock partitioning according to a desired configuration.

13. An apparatus as recited in claim 12, wherein said apparatus is configured for computing a subblock cost value for at least a portion of the possible subblock configurations and discarding subblock configurations whose cost exceeds a threshold, or the number of bits available.

14. An apparatus as recited in claim 1, wherein said input video data is received from an image sensor.

15. An apparatus as recited in claim 1, wherein said apparatus is configured for integration within a video or still camera.

16. An apparatus as recited in claim 1, wherein said input video data comprises a format having luminance and chrominance YUV information in the form Y, Cr and Cb.

17. An apparatus as recited in claim 1, wherein said compression and decompression is performed to reduce bus bandwidth and video memory requirements when encoding video data.

18. An apparatus as recited in claim 1, wherein said apparatus is configured for compressing and decompressing video data prior to video encoding, for transmitting compressed video data over a network prior to decompression, or for storing video data to a media device prior to decompression.

19. An apparatus as recited in claim 1, wherein:
    said video compression is performed utilizing non-linear quantization; and
    different precisions of quantization step sizes are utilized when performing said non-linear quantization.

20. An apparatus for compressing and decompressing YUV video data, comprising:
    (a) a video memory configured for communicating video pixel data with one or more video modules;
    (b) a video compression module coupled through a signal bus to said video memory and configured for,
        compressing blocks of luminance and chrominance YUV input video data using a quantizer into compressed blocks within a compressed video data having a reduced number of bits per pixel,
        wherein block compression is performed without utilizing pixel data outside of each block,
        storing said compressed video data within said video memory;
    (c) a video decompression module configured for retrieving blocks of compressed video data in any order and for decompressing the compressed video data stored in said video memory into decompressed video data which has the same format and approximates the original video data which was received and compressed by said video compression module;
    said video decompression module configured to output said decompressed video data; and
    wherein during compression, pixel predictions are performed starting at an initial reference pixel in the middle of the block which remains the same for both right and left directions of prediction, and subblock partitioning performed.

21. An apparatus as recited in claim 20, wherein said block compression is performed according to an overall compression ratio R, which controls the extent of block compression.

22. An apparatus as recited in claim 21, wherein said overall compression ratio R can be expressed ratiometrically, or in terms of the number of bits contained in the resultant block.

23. An apparatus as recited in claim 21, wherein said apparatus is configured for selecting the same or different compression levels for luma and chroma while maintaining overall compression ratio R.

24. An apparatus as recited in claim 23, wherein unless chroma has a high complexity level, the extent of said compression is selected to minimize bit use in chroma, and maximize bit use in luma.

25. An apparatus as recited in claim 24, wherein said apparatus is configured for estimating texture complexity of compression blocks prior to said compression.

26. An apparatus as recited in claim 25, wherein the number of bits to be allocated for luma and chroma within the compressed block are determined in response to estimating texture complexity.

27. An apparatus as recited in claim 20, wherein said apparatus is configured for padding the compressed video data with padding bits to maintain a fixed size for the compressed blocks.

28. An apparatus as recited in claim 20, wherein Luma compression for a given block utilizes information from Chroma compression of that same block.

29. An apparatus as recited in claim 20, wherein said right and left prediction directions are defined which can be processed in parallel.

30. An apparatus as recited in claim 20, wherein said pixel prediction predicts current pixel values based on previous pixel values.

31. An apparatus as recited in claim 20, wherein during said pixel prediction, the prediction of the two directions is independent, whereby the prediction process for right and left directions is performed in parallel and the required processing time is reduced to one-half.

32. An apparatus as recited in claim 20, wherein said apparatus is configured for computing a subblock cost value for at least a portion of possible subblock configurations and discarding subblock configurations whose cost exceeds a threshold, or number of bits available.

33. An apparatus as recited in claim 20, wherein said input video data is received from an image sensor.

34. An apparatus as recited in claim 20, wherein said apparatus is configured for integration within a video or still camera.

35. An apparatus as recited in claim 20, wherein said input video data comprises a format having luminance and chrominance YUV information in the form Y, Cr and Cb.

36. An apparatus as recited in claim 20, wherein said compression and decompression is performed to reduce bus bandwidth and video memory requirements when encoding video data.

37. An apparatus as recited in claim 20, wherein said apparatus is configured for compressing and decompressing video data prior to video encoding, for transmitting compressed video data over a network prior to decompression, or for storing video data to a media device prior to decompression.

38. An apparatus as recited in claim 20:
wherein said video compression is performed utilizing non-linear quantization; and
wherein different precisions of quantization step sizes are utilized when performing said non-linear quantization.

* * * * *